United States Patent
Metzger et al.

(10) Patent No.: US 9,462,426 B1
(45) Date of Patent: Oct. 4, 2016

(54) SYSTEM AND METHOD FOR IDENTIFYING TALK BURST SOURCES

(71) Applicants: Larry R. Metzger, Wake Forest, NC (US); Mark Conrad Gonsalves, Monggomery, TX (US); Zeeshan R. Khan, Fremont, CA (US)

(72) Inventors: Larry R. Metzger, Wake Forest, NC (US); Mark Conrad Gonsalves, Monggomery, TX (US); Zeeshan R. Khan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/678,342

(22) Filed: Apr. 3, 2015

(51) Int. Cl.
  *H04Q 7/20* (2006.01)
  *H04W 4/10* (2009.01)
  *H04W 72/04* (2009.01)
  *H04W 72/10* (2009.01)

(52) U.S. Cl.
  CPC ........... *H04W 4/10* (2013.01); *H04W 72/0446* (2013.01); *H04W 72/10* (2013.01)

(58) Field of Classification Search
  CPC ........... H04L 65/1013; H04L 65/1016; H04L 65/4061; H04W 4/10; H04W 76/005; G10L 21/04
  USPC ...................... 455/518, 519, 416, 422.1, 255; 370/312, 352, 338, 466; 709/227, 205
  See application file for complete search history.

(56) References Cited

U.S. PATENT DOCUMENTS

| | | | | |
|---|---|---|---|---|
| 7,561,892 B2* | 7/2009 | Huh | ...................... | H04W 76/005 370/260 |
| 7,809,391 B2* | 10/2010 | Kwon | ...................... | H04W 4/10 455/518 |
| 2005/0227657 A1* | 10/2005 | Frankkila | ................ | G10L 21/04 455/255 |
| 2006/0019692 A1* | 1/2006 | Huh | ...................... | H04W 76/005 455/518 |
| 2006/0030344 A1* | 2/2006 | Lim | ........................ | H04W 4/10 455/512 |
| 2006/0034260 A1* | 2/2006 | Svedberg | ................ | H04W 4/10 370/352 |
| 2006/0040685 A1* | 2/2006 | Kwon | ...................... | H04W 4/10 455/507 |
| 2006/0116150 A1* | 6/2006 | Bhutiani | ............. | H04L 65/4061 455/518 |
| 2006/0294243 A1* | 12/2006 | Kuure | ................... | H04L 63/104 709/227 |
| 2007/0021136 A1* | 1/2007 | Allen | ................... | H04B 1/3833 455/518 |
| 2007/0173273 A1* | 7/2007 | Gogic | ................... | H04B 7/026 455/518 |

(Continued)

*Primary Examiner* — Tan H Trinh
(74) *Attorney, Agent, or Firm* — P. Su

(57) ABSTRACT

According to one aspect, a method includes obtaining, at a client included in a push-to-talk (PTT) system, a plurality of talk bursts including at least a first talk burst and a second talk burst, the first talk burst being associated with a first source included in the PTT system, the second talk burst being associated with a second source included in the PTT system, wherein the plurality of talk bursts are obtained at approximately a first time. The method also includes identifying the first source as a source of interest and determining, after identifying the first source as the source of interest, an identity of the first source. Finally, the method includes processing the first talk burst as having a priority over the second talk burst.

20 Claims, 7 Drawing Sheets

(56) References Cited

U.S. PATENT DOCUMENTS

| | | | |
|---|---|---|---|
| 2008/0037448 A1* | 2/2008 | Kelley | H04W 72/005 370/270 |
| 2008/0200162 A1* | 8/2008 | Chowdhury | H04L 12/1836 455/422.1 |
| 2008/0220765 A1* | 9/2008 | Chu | H04L 65/4061 455/422.1 |
| 2008/0233990 A1* | 9/2008 | Jen | H04L 65/1006 455/518 |
| 2009/0143029 A1* | 6/2009 | Matsumoto | H04W 4/10 455/90.2 |
| 2009/0298501 A1* | 12/2009 | Larsson | H04W 76/005 455/436 |
| 2010/0158231 A1* | 6/2010 | Newberg | H04W 4/08 379/202.01 |
| 2010/0261497 A1* | 10/2010 | Cooper | H04W 4/10 455/519 |
| 2012/0163204 A1* | 6/2012 | Oprescu-Surcobe | H04W 72/005 370/252 |
| 2012/0170501 A1* | 7/2012 | Drozt | H04W 72/005 370/312 |
| 2013/0029714 A1* | 1/2013 | Koren | H04W 4/10 455/518 |
| 2013/0151622 A1* | 6/2013 | Goel | H04L 12/1822 709/205 |
| 2014/0187280 A1* | 7/2014 | Bekiares | H04W 4/08 455/519 |
| 2015/0256984 A1* | 9/2015 | Patel | H04W 4/10 455/416 |

* cited by examiner

SYSTEM AND METHOD FOR IDENTIFYING TALK BURST SOURCES

TECHNICAL FIELD

The disclosure relates generally to communications networks. More particularly, the disclosure relates to processing talk bursts in push-to-talk (PTT) systems.

BACKGROUND

Some push-to-talk (PTT) systems, as for example legacy PTT systems, enable a source to transmit a talk burst into a talk group substantially only when the source is granted floor control. Other PTT systems, as for example bridging systems such as Internet Protocol Interoperability and Collaboration Systems (IPICS) PTT systems, are such that multiple sources may transmit talk bursts at substantially the same time.

Within a bridging solution PTT system, when multiple talk bursts, e.g., up to three talk bursts, arrive at a client a substantially the same time, the talk bursts are effectively overlaid with respect to each other. In addition, on a display screen of the client, the sources of the talk bursts are typically listed, without identifying exactly which talk burst originated with which source. That is, the display screen of the client generally lists the sources of the talk bursts such that the client is aware that talk bursts have been obtained from the sources, without indicating which talk burst belongs to which source. Thus, an association between a source and a talk burst may not readily be made when up to three talk bursts arrive at a client at substantially the same time. Further, bridging solution PTT systems generally do not provide a mechanism that enables the sources of talk bursts to be identified when more than three sources send talk bursts arrive at a client at approximately the same time.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
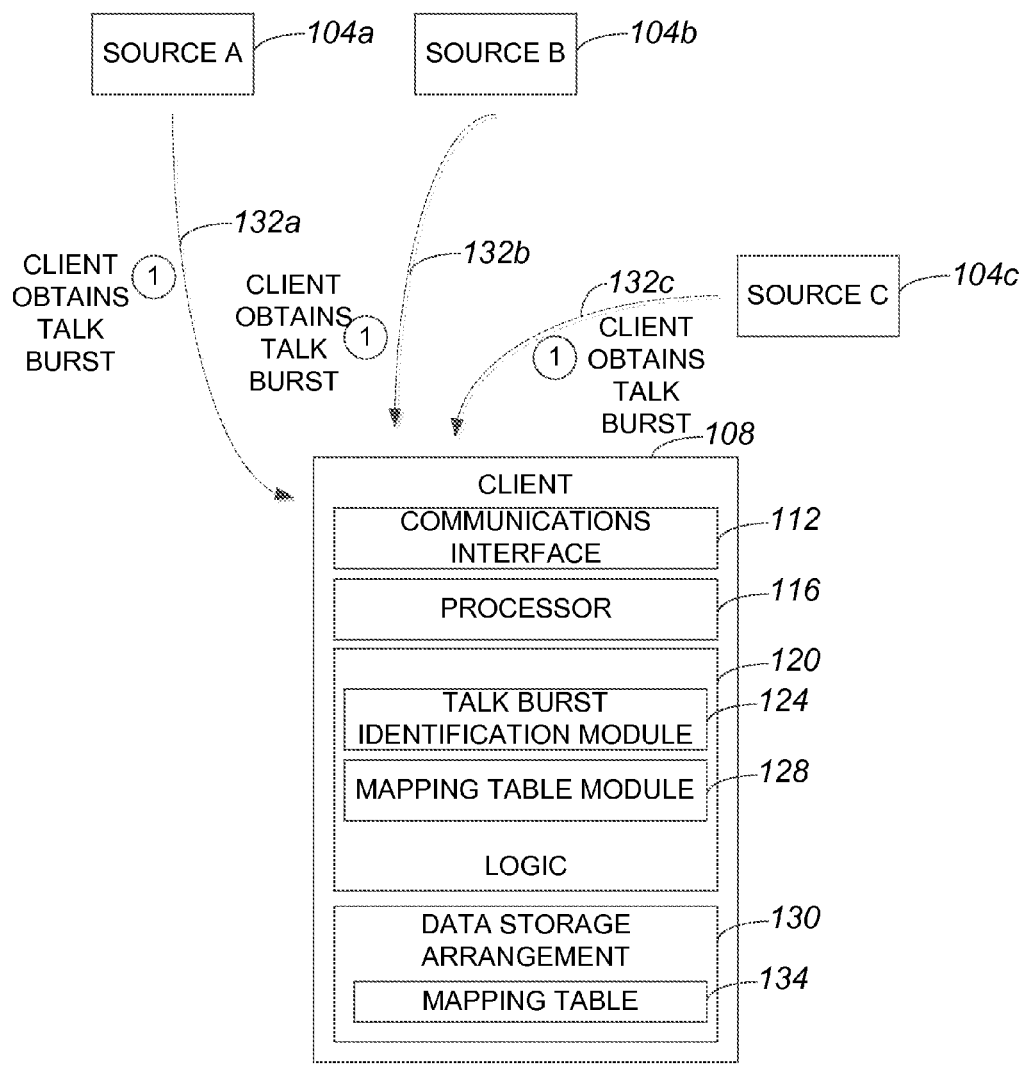
FIG. 1A is a diagrammatic representation of an overall push-to-talk (PTT) system at a time t1 at which a client obtains multiple talk bursts at substantially the same time in accordance with an embodiment.

In one embodiment, a method includes obtaining, at a client included in a push-to-talk (PTT) system, a plurality of talk bursts including at least a first talk burst and a second talk burst, the first talk burst being associated with a first source included in the PTT system, the second talk burst being associated with a second source included in the PTT system, wherein the plurality of talk bursts are obtained at approximately a first time. The method also includes identifying the first source and the second source, identifying the first source as a source of interest and determining, after identifying the first source as the source of interest, an identity of the first source. Finally, the method includes processing the first talk burst as having a priority over the second talk burst.

DESCRIPTION

Some push-to-talk (PTT) systems, as for example bridging systems such as Internet Protocol Interoperability and Collaboration Systems (IPICS) PTT systems, are such that multiple sources may transmit talk bursts or, more generally, audio signals, at substantially the same time. PTT systems which utilize a Bridging Systems Interface enable multiple sources to transmit talk bursts to a client at substantially the same time, and do not effectively require floor control to be obtained by a source before the source may transmit a talk burst to a client.

As will be appreciated by those skilled in the art, a Bridging Systems Interface generally allows bridging systems to communicate with each other. A bridging system is generally a device or an element in a communications network which allows audio communications, e.g., voice communications, to occur between different systems or sources. The different systems or sources typically include, but are not limited to including, radios, landline phones, mobile phones, Voice over Internet Protocol (VoIP) phones, and computing devices.

When talk bursts from multiple, e.g., two or more, sources are obtained by a client at substantially the same time, a record pertaining to each of the talk bursts may be created and/or maintained. By keeping a record of talk bursts from each source of a Bridging Systems Interface based PTT talk group when the talk bursts arrive at a client of the PTT talk group at approximately the same time, the loss of information pertaining to the talk bursts may be reduced. In addition, proper prioritization of the talk bursts may be possible, as for example if information associated with the priority of sources from which the talk bursts originate is available in or with the record of talk bursts.

A client which effectively maintains a record of each talk burst for each source in a talk group may efficiently look-up the record to identify talk burst and their associated sources. Such a client may also selectively identify and act upon a source of an individual talk burst by maintaining a record. The client, or a receiver, may map substantially all of the sources without regard for whether the sources have floor control or not. As a result, priority may be assigned to talk bursts and recordings of the talk bursts may be played.

The sources of substantially all talk bursts obtained at a given point in time may be identified or otherwise recognized. In one embodiment, talk bursts which are effectively hidden in a floor controlled PTT system may be identified and acted upon. For example, priority may be applied for all talk bursts and, hence, all talkers, and not just for the first few talk bursts. A receiver of talk bursts may map substantially all sources of talk bursts essentially without regard to the sources which are recognized as having floor control. As a result, priority and/or recording replay may be applied to sources of substantially all talk bursts obtained by a receiver at a given time.

Figure 1B:
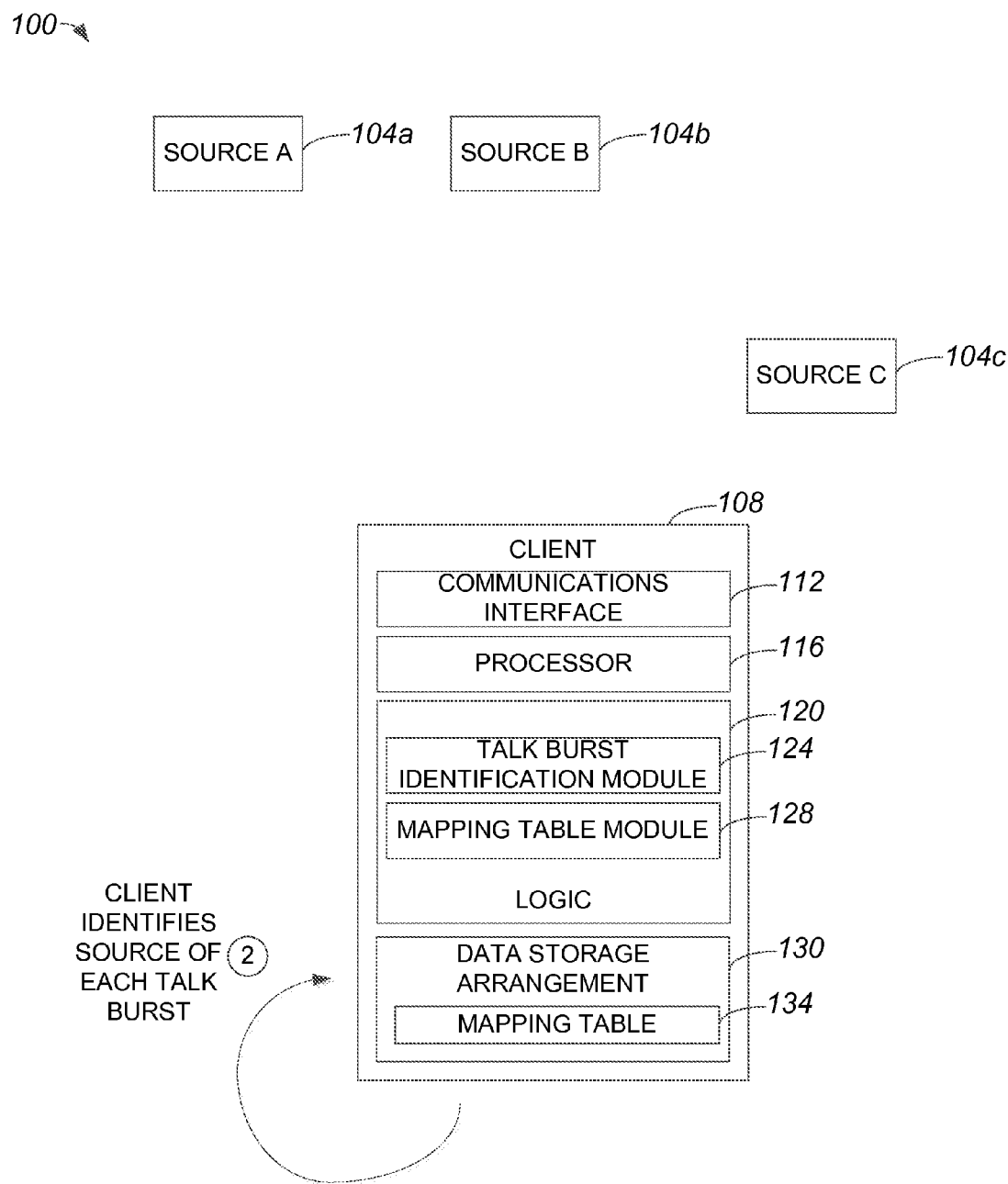
FIG. 1B is a diagrammatic representation of an overall PTT system, e.g., overall PTT system 100 of FIG. 1A, at a time t2 at which a client, e.g., client 108 of FIG. 1A, identifies the sources of talk bursts in accordance with an embodiment of the present invention.

Referring initially to FIGS. 1A and 1B, an overall Bridging Systems Interface based PTT system will be described in accordance with an embodiment. An overall PTT system 100 includes a plurality of sources 104*a-c* and a client 108. Sources 104*a-c* and client 108 may be associated with a talk group or channel. It should be appreciated that although three sources 104*a-c* are shown, overall PTT system 100 may include any number of sources 104*a-c*. In one embodiment, overall PTT system 100 may be a talk group.

Sources 104*a-c* may be PTT devices which may be used by a speaker or a talker to transmit talk bursts 132*a-c* within overall PTT system 100. In general, client 108 may be any suitable device that may obtain transmissions from sources 104*a-c*. For example, client 108 may be a PTT device. In one embodiment, client 108 may be an IPCS Dispatch Console (IDC) available from Cisco Systems, Inc. of San Jose, Calif., or client 108 may be a media service infrastructure component such as a Universal Media Service (UMS) available from Cisco Systems, Inc. of San Jose, Calif.

Client 108 generally includes a communications interface 112, a processor 116, logic 120, and a data storage arrangement 130. Communications interface 112, which may include at least one input/output (I/O) port (not shown), is arranged to enable client 108 to communicate within overall PTT system 100. For example, communications interface 112 is configured to allow client 108 to receive or to otherwise obtain packets from sources 104*a-c*, and to allow client 108 to send or to otherwise provide packets to source 104*a-c*. It should be appreciated that although communications within overall PTT system 100 are generally wireless, communications are not limited to being wireless. Logic 120 includes hardware and/or software logic which is configured to be executed by a processor 116. Data storage arrangement 130 is configured to store information that may be used by client 108. In one embodiment, data storage arrangement 130 may be a database.

Logic 120 includes a talk burst identification module 124 and a mapping table module 128. Talk burst module identification module 124 is configured to identify when a talk burst 132*a-c* is obtained or received by client 108, and to identify a source 104*a-c* of talk burst 132*a-c*. That is, in addition to detecting the existence of talk bursts 132*a-c*, talk burst identification module 124 is arranged to identify that talk burst 132*a* originated from source "A" 132*a*, to identify that talk burst 132*b* originated from source "B" 132*b*, and to identify that talk burst 132*c* originated from source "C" 132*c*. In one embodiment, talk burst identification module 124 is further arranged to determine if one of source 132*a-c* is of interest, e.g., has priority over the other sources 132*a-c*. Mapping table module 128 is arranged to create and/or to maintain a table 134, which may be static or dynamic, and which contains information relating to talk bursts 132*a-c*. Such a table 134 may be maintained in data storage arrangement 130, and may contain information including, but not limited to including, the identity of sources 104*a-c* for talk bursts 132*a-c*, any priorities associated with sources 104*a-c*, and the content of talk bursts 132*a-c*.

At a time t1, as shown in FIG. 1A, client 108 obtains talk bursts 132*a-c* at substantially the same time. At a time t2, as shown in FIG. 1B, after client 108 obtains talk bursts 132*a-c* at approximately the same time, client 108 identifies sources 104*a-c* of talk bursts 132*a-c*. In the described embodiment, talk burst identification module 124 identifies talk burst 132*a* as coming from source 104*a*, identifies talk burst 132*b* as coming from source 104*b*, and identifies talk burst 132*c* as coming from source 104*c*. It should be appreciated that client 108*a*, upon identifying sources of talk bursts 132*a-c*, may use mapping table module 128 to create mapping table 134 in data storage arrangement 130, and store information relating to talk bursts 132*a-c* and sources 104*a-c* in mapping table 134.

In general, any suitable information may be stored in mapping table 134. Information may generally be stored as entries in mapping table 134. In one embodiment, recordings of talk bursts 132*a-c* may be stored in data storage arrangement 130 while mapping table 134 stores identifiers arranged to identify sources 104*a-c* and locations at which the recordings are stored. Recordings may be stored such that content may be subsequently replayed passed on sources 104*a-c*. That is, even if client 108*a* perceives talk bursts 132*a-c* as coming from one mixed audio speaker transmission, client 108*a* may later split the overall audio transmission and listen to each talk burst 132*a-c* individually or on its own.

It should be appreciated that, at time t1 as shown in FIG. 1A, there is effectively no limit on a number of substantially simultaneous talkers, or sources of talk bursts 104*a-c*. The identity of sources 104*a-c* may be identified even in the event that one of sources 104*a-c* is not in a mixed audio speaker transmission.

Figure 2:
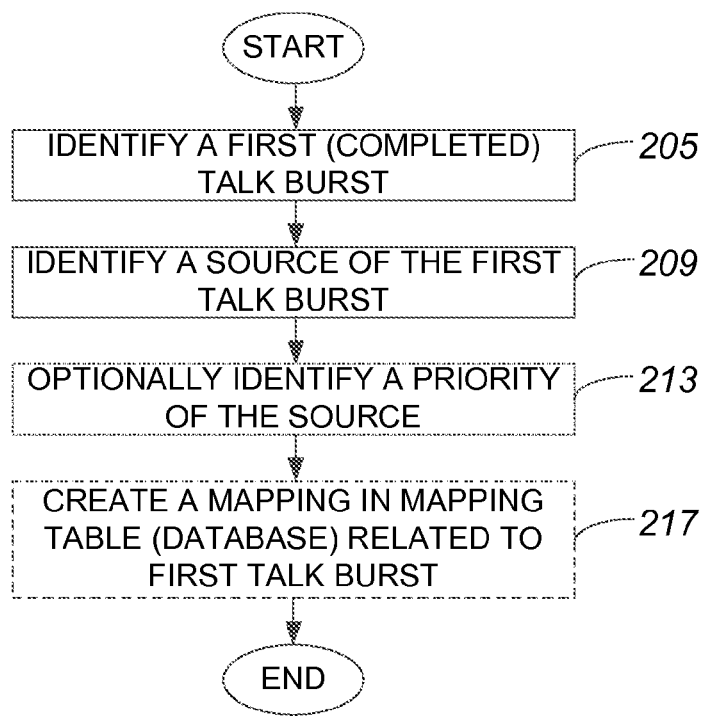
FIG. 2 is a process flow diagram which illustrates one example of a method of maintaining information relating to a talk burst in accordance with an embodiment.

FIG. 2 is a process flow diagram which illustrates a method of maintaining information relating to a talk burst in accordance with an embodiment. A method 201 of maintaining information relating to a talk burst begins at step 205 in which a first talk burst is identified, as for example by a recipient of the first talk burst. In one embodiment, a talk burst is identified when it has been completed, or when both a start of the first talk burst and an end of the first talk burst have been identified. One process of identifying a first talk burst will be discussed below with reference to FIG. 3.

Once a first talk burst is identified, a source of the first talk burst is identified in step 209. Using information contained in the packets of the first talk burst, the source of the first talk burst may be identified. It should be appreciated that there may be different types of source addresses. One type of source address is an Address of Record (AOR), which is typically a publicly published address of a user, e.g., a phone number, although an internal system may generally map the publicly published address of the user to a source. As such, a dynamic translation of a source may occur. For instance, if a caller calls a phone number, the AOR of the caller may not be the actual source as the call flows through a system, but may represent a way for the call to be mapped to the caller.

In one embodiment, an internal dynamic source may change and may be an ephemeral identifier that is included in meta data and a packet. Such an ephemeral identifier may exist between a mapping table and a talk burst source.

Returning to step 209, after the source of the first talk burst is identified, a priority associated with the source may optionally be identified in step 213. That is, in optional step 213, a priority such as a processing priority for talk bursts transmitted by the source may be identified.

In optional step 217, a mapping is created in a mapping table for the first talk burst. The mapping, which is an entry that typically identifies the first talk burst and the source of the first talk burst, may be stored in a static or dynamic mapping table that is located in a database of the recipient of the first talk burst. A priority for the source may also be stored in the mapping table. Upon creating a mapping in a mapping table, the method of maintaining information relating to a talk burst is completed. It should be appreciated that a mapping table may be created manually, and is not created in some embodiments as a part of a method for maintaining information relating to a talk burst.

Figure 3:
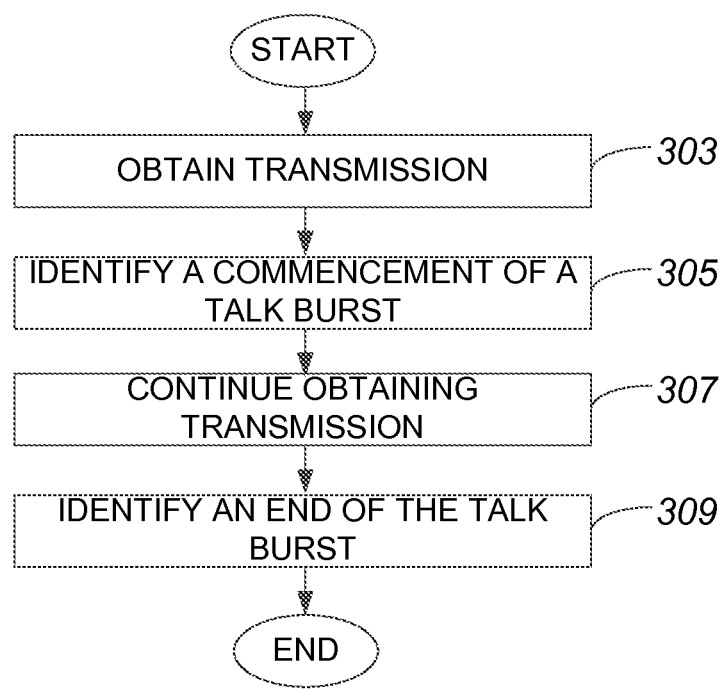
FIG. 3 is a process flow diagram which illustrates one method of identifying a talk burst, e.g., step 205 of FIG. 2, in accordance with an embodiment.

With reference to FIG. 3, one method of identifying a talk burst, e.g., step 205 of FIG. 2, will be described in accordance with an embodiment. A process 205 of identifying a talk burst begins at step 303 in which a transmission is obtained. The transmission, which generally includes at least one packet, may be obtained by a client from a source in an overall PTT system.

After obtaining a transmission, a commencement or beginning of a talk burst is identified in step 305. One method of identifying a commencement of a talk burst will be described with reference to FIG. 4. Once the commencement of the talk burst is identified, the transmission continues to be obtained in step 307. An end of the talk burst may then be identified in step 309. One method of identifying an end of the talk burst will be described with reference to FIG. 5. Upon identifying the end of the talk burst, the process of identifying a talk burst is completed.

Figure 4:
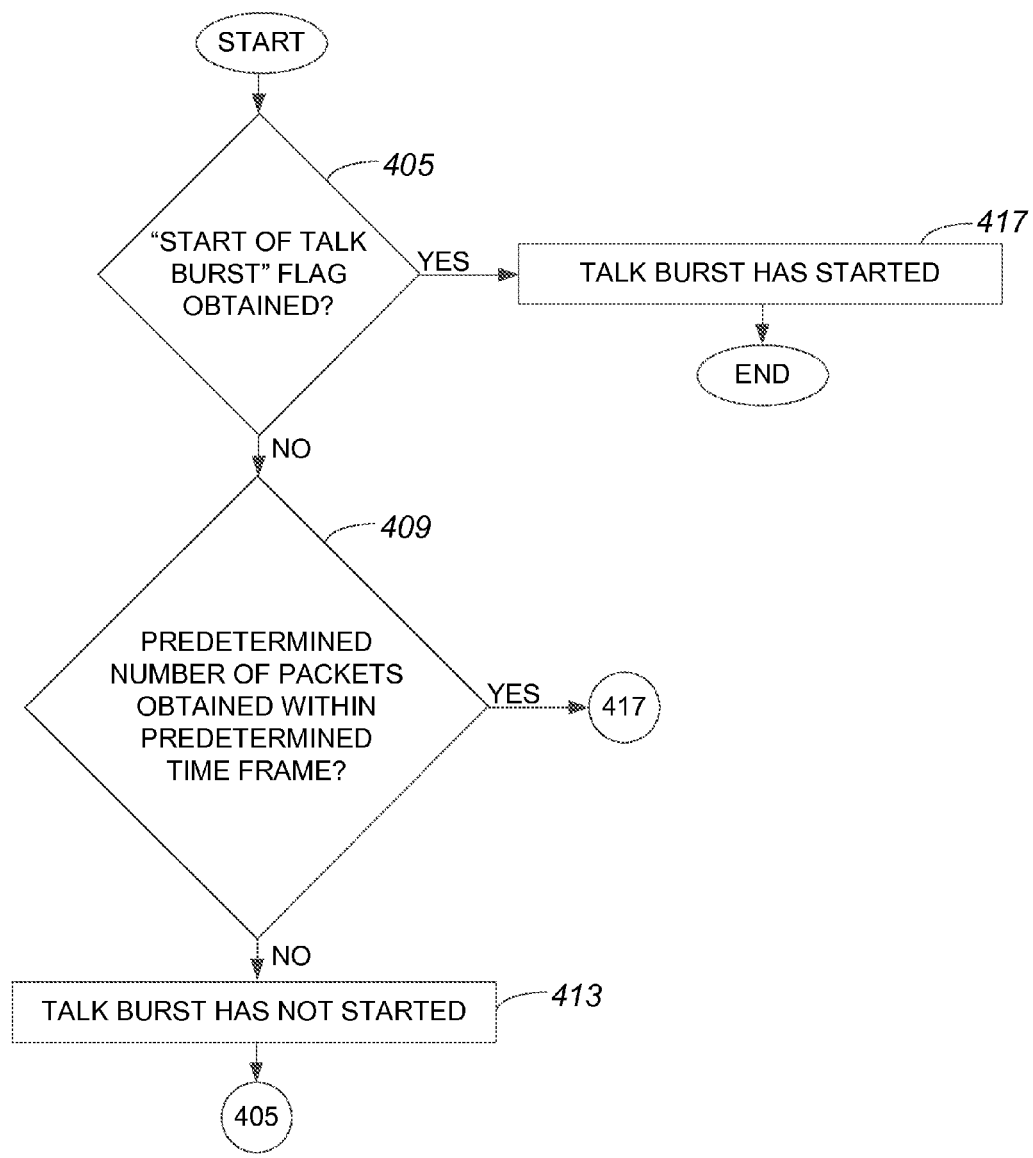
FIG. 4 is a process flow diagram which illustrates one method of identifying a commencement of a talk burst, e.g., step 305 of FIG. 3, in accordance with an embodiment.

FIG. 4 is a process flow diagram which illustrates one method of identifying a commencement or beginning of a talk burst, e.g., step 305 of FIG. 3, in accordance with an embodiment. A process 305 of identifying a commencement or a beginning of a talk burst begins at step 405 in which a "start of talk burst" flag is obtained. In one embodiment, a "start of talk burst" flag may be obtained from a source when the source signals a PTT talk burst. When a "start of talk burst" flag is received or otherwise obtained by a client, a talk burst may be determined to have started. As such, if a "start of talk burst" flag is obtained in step 405, then in step 417, it is determined that a talk burst has started, and the process of identifying a commencement of a talk burst is completed.

Alternatively, if it is determined in step 405 that a "start of talk burst" flag has not been obtained, then a client may determine whether a talk burst has started by substantially ascertaining whether there is any other indication that a talk burst has been initiated. It should be appreciated that a packet containing a "start of talk burst" flag may have been lost and, thus, a talk burst may have started even if a "start of talk burst" flag has not been received. In the described embodiment, a determination is made in step 409 as to whether at least a predetermined number of packets have been obtained within a predetermined time frame. The number of packets obtained, and the time frame during which the packets are obtained, may vary widely. In general, the number of packets obtained and the time frame during which the packets are obtained may be determined based upon what is considered to be a valid number of packets, or a number of packets that is believed to accurately indicate that a talk burst has started.

If the determination in step 409 is that at least predetermined number of packets has been obtained within a predetermined time frame, then the implication is that a talk burst has started. Accordingly, process flow moves to step 417 in which the talk burst is identified as started.

Alternatively, if it is determined in step 409 that at least a predetermined number of packets have not been obtained within a predetermined time frame, then, in step 413, a talk burst is identified as not being started. Once a talk burst is identified as not being started, process flow returns to step 405 in which it is determined whether a "start of talk burst" flag is obtained.

Figure 5:
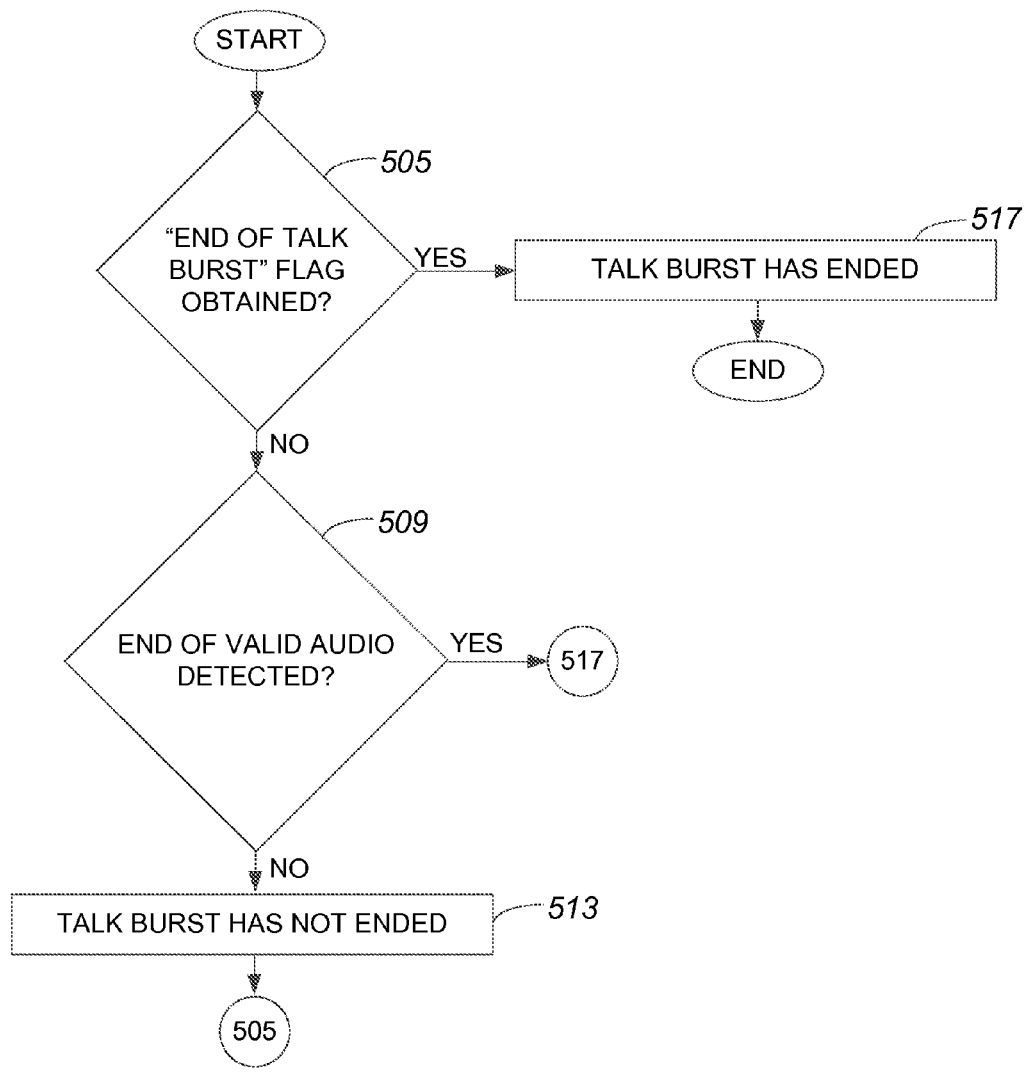
FIG. 5 is a process flow diagram which illustrates one method of identifying an end of a talk burst, e.g., step 309 of FIG. 3, in accordance with an embodiment.

With reference to FIG. 5, one method of identifying an end of a talk burst, e.g., step 309 of FIG. 3, will be described in accordance with an embodiment. A process 309 of identifying an end of a talk burst begins at step 505 in which it is determined whether an "end of talk burst" flag is obtained. An "end of talk burst" flag may be included in a packet obtained by a server in a packet which is arranged to indicate an end of a talk burst, e.g., an "end of talk burst" packet. Such a packet may generally be included in a stream of audio packets obtained by a client from a source.

If the determination in step 505 is that an "end of talk burst" packet has been obtained, then the talk burst is determined to be ended in step 517. The process of identifying an end of a talk burst is completed once the talk burst is determined to be ended.

Alternatively, if the determination in step 505 is that an "end of talk burst" flag has not been obtained, a determination is made in step 509 as to whether an end of valid audio or, more generally, content has been detected. The end of valid audio may be detected, for example, if less than a predetermined number of packets obtained over a predetermined amount of time contain valid audio.

If it is determined in step 509 that an end of valid audio has been detected, process flow moves to step 517 in which the talk burst is determined to be ended. Alternatively, if it is determined in step 509 that an end of valid audio has not been detected, than the talk burst is determined to not be ended in step 513. As such, the indication is that the talk burst is still ongoing. From step 513, process flow returns to step 505 in which it is determined if an "end of talk burst" flag is obtained.

Figure 6:
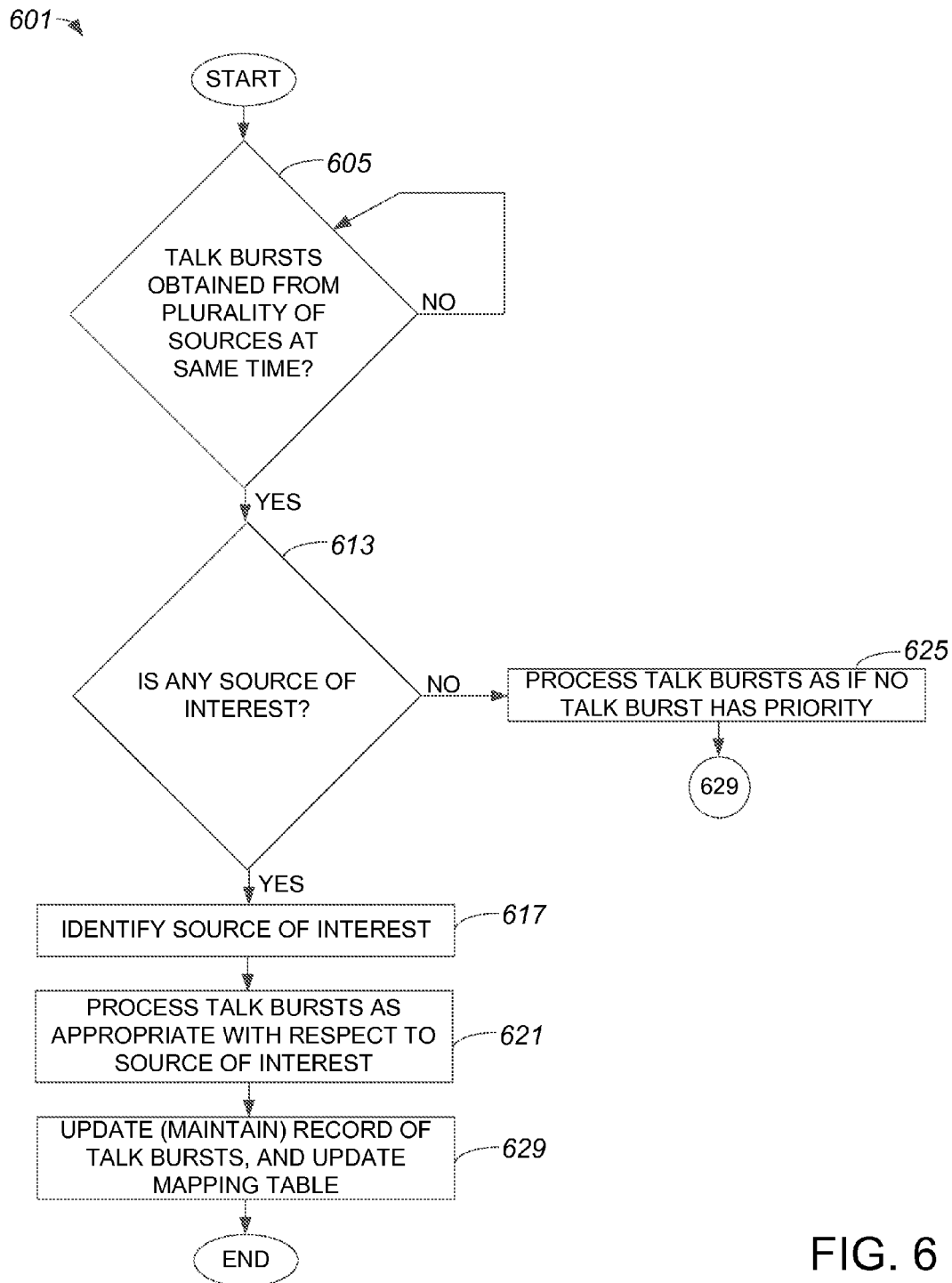
FIG. 6 is a process flow diagram which illustrates one method of processing talk bursts that arrive at substantially the same time in accordance with an embodiment of the present invention.

In bridging system interface PTT systems, situations may arise in which two or more talk bursts are effectively obtained by a client at substantially the same time. That is, sources in an overall PTT system may send or otherwise generate talk bursts that are obtained by a client in the overall PTT system substantially simultaneously. FIG. 6 is a process flow diagram which illustrates one method of processing talk bursts that arrive at a client at substantially the same time, or substantially simultaneously, in accordance with an embodiment of the present invention. A method 601 of processing talk bursts that are obtained by a client substantially simultaneously begins at step 605 in which it is determined whether talk bursts are obtained by a client from a plurality of sources at approximately the same time. If it is determined that talk bursts are not obtained from a plurality of sources at approximately the same time, then the determination in step 605 is repeated.

Alternatively, if it is determined in step 504 that talk bursts are obtained from a plurality of sources at approximately the same time, process flow moves to step 613 in which it is determined whether any of the plurality of sources is of interest. A source may be of interest if, for example, the source is identified as a priority source or the audio provided by the source indicates an emergency or other significant situation associated with the source. In one embodiment, determining whether a particular source is of interest may include obtaining identifying information for substantially all sources from which talk bursts have been obtained.

If the determination in step 613 is that no source is of interest, the talk bursts are processed as if no particular talk burst has priority over other talk bursts in step 625. Once the talk bursts are processed, then the talk bursts are accounted for in, e.g., added to, a record of talk bursts, and a mapping table is updated, in step 629. The record of talk bursts may be recordings of the talk bursts. A mapping table may identify sources of the talk bursts and provide mappings that map the sources to their associated talk bursts. In one embodiment, the mapping table may also identify priorities associated with the sources. The record of the talk bursts and the mapping table may be stored on, or otherwise associated with, the client. It should be appreciated that the record of the talk bursts and the mapping table may effectively form a searchable database of talk bursts. After the record of talk bursts and the mapping table are updated, the method of processing talk bursts is completed.

Returning to step 613, if it is determined that there is a source of interest, e.g., that a particular source has priority over other sources, then the source of interest is identified in step 617. Once the source of interest is identified, the talk bursts are processed in step 621 as appropriate with respect to the source of interest. Processing the talk bursts as appropriate with respect to the source of interest may include, but is not limited to including, prioritizing talk bursts obtained from the source of interest over talk bursts obtained from other sources. Processing talk bursts when a particular talk burst is identified as a source of interest may also include handling the audio and the metadata of the particular talk burst with priority, and may further include substantially preempting the other sources, e.g., the sources which are not sources of interest. That is, processing a particular talk burst as having priority typically includes preempting the audio and the metadata of the other sources. Preempting audio from the other sources may include, but is not limited to including, muting the audio provided from the other sources.

After the talk bursts are processed as appropriate with respect to the source of interest, a record of talk bursts and a mapping table are updated in step 629. Updating a record of talk bursts may include, in one embodiment, creating recordings of the talk bursts processed in step 621. Upon updating or maintaining the record of talk bursts and the mapping table, the method of processing talk bursts is completed.

Although only a few embodiments have been described in this disclosure, it should be understood that the disclosure may be embodied in many other specific forms without departing from the spirit or the scope of the present disclosure. By way of example, a source of interest has generally been described as a source which provides a talk burst that has priority over talk bursts provided by other sources. A particular talk burst may have priority over other talk bursts if the particular talk burst is produced by a source which has a relatively high priority, e.g., a source which is identified as being important. A particular talk burst may also have priority over other talk bursts if the particular talk burst includes sounds, e.g., spoken words, which generally signify an emergency or an otherwise important circumstance. For instance, a talk burst in which terms such as "fire," "call the police," "send help," etc. are uttered may be given priority.

Each talk burst may be identified by a client with metadata including, but not limited to including, a talk burst start time, a talk burst end time, and an indication of a source of the talk burst. The talk burst start time may be based upon a timestamp provided by a client that receives a talk burst, and the talk burst end time may be based upon a timestamp provided by the client.

False or otherwise inaccurate completions of a talk burst may be detected. For example, a period of relative silence in a talk burst may be inaccurately identified as a completion of the talk burst. When an end of a talk burst is falsely detected when there is a period of relative silence, it should be appreciated that an end of the period of relative silence may effectively be considered as a start of a new talk burst.

In one embodiment, an individual source in a PTT talk group may effectively be placed into its own virtual talk group. By way of example, a source of a first talk burst that arrives at a client at approximately the same time as a plurality of other talk bursts is identified as a source of interest, the source of the first talk burst may be placed into its own virtual talk group. It should be appreciated that the source of the first talk burst may be manually or automatically placed into its own virtual talk group.

While storing a talk burst and/or information associated with a source of the talk burst has been described in the context of a Bridging System Interface PTT system, it should be appreciated that the storage of a talk burst and/or information associated with the source of the talk burst is not limited to being used in a Bridging System Interface PTT system. For instance, talk bursts and/or information associated with sources of the talk bursts may be stored in any PTT system which does not generally identify individual talk bursts and/or process the talk bursts when a plurality of talk bursts arrive at a client at substantially the same time.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:
1. A method comprising:
obtaining, at a client included in a push-to-talk (PTT) system, a plurality of talk bursts including at least a first talk burst and a second talk burst, the first talk burst being associated with a first source included in the PTT system, the second talk burst being associated with a second source included in the PTT system, wherein the plurality of talk bursts are obtained at approximately a first time;
identifying the first source and the second source;
identifying the first source as a source of interest;

determining, after identifying the first source as the source of interest, an identity of the first source; and processing the first talk burst as having a priority over the second talk burst.

2. The method of claim 1 wherein processing the first talk burst as having the priority over the second talk burst includes at least one selected from a group including processing audio included in the first talk burst as having the priority and processing metadata associated with the first talk burst as having priority.

3. The method of claim 1 wherein processing the first talk burst as having the priority over the second talk burst further includes preempting the second source.

4. The method of claim 1 further including:
creating a record, the record including at least the first talk burst;
storing the record in a data storage arrangement associated with the client; and
adding an entry to a mapping table, the entry being arranged to identify at least the first source and the record, the mapping table being stored in the data arrangement.

5. The method of claim 1 further including:
identifying the first talk burst, wherein identifying the first talk burst includes identifying a start of the first talk burst and identifying an end of the first talk burst.

6. The method of claim 5 wherein identifying the start of the first talk burst includes:
determining if a first flag is obtained;
identifying the start of the first talk burst if it is determined that the first flag is obtained;
determining if at least a predetermined number of packets has been obtained within a first predetermined time frame if it is determined that the first flag is not obtained; and
identifying the start of the first talk burst if it is determined that the at least predetermined number of packets has been obtained within the first predetermined time frame.

7. The method of claim 5 wherein identifying the end of the first talk burst includes:
determining if a second flag is obtained;
identifying the end of the first talk burst if it is determined that the second flag is obtained;
determining if valid audio has not been obtained within a second predetermined time frame if it is determined that the second flag is not obtained; and
identifying the end of the first talk burst if it is determined that the valid audio has not been obtained within the second predetermined time frame.

8. Logic encoded in one or more tangible non-transitory, computer-readable media for execution and when executed operable to:
obtain a plurality of talk bursts including at least a first talk burst and a second talk burst, the first talk burst being associated with a first source included in a Push-to-Talk (PTT) system, the second talk burst being associated with a second source included in the PTT system, wherein the plurality of talk bursts are obtained at approximately a first time;
identify the first source and the second source;
identify the first source as a source of interest;
determine, after identifying the first source as the source of interest, an identity of the first source; and
process the first talk burst as having a priority over the second talk burst.

9. The logic of claim 8 wherein the logic operable to process the first talk burst as having the priority over the second talk burst includes at least one selected from a group including logic operable to process audio included in the first talk burst as having the priority and logic operable to process metadata associated with the first talk burst as having priority.

10. The logic of claim 8 wherein the logic operable to process the first talk burst as having the priority over the second talk burst is further operable to preempt the second source.

11. The logic of claim 8, wherein the logic is further operable to:
create a record, the record including at least the first talk burst;
store the record in a data storage arrangement; and
add an entry to a mapping table, the entry being arranged to identify at least the first source and the record, the mapping table being stored in the data storage arrangement.

12. The logic of claim 8 further operable to:
identify the first talk burst, wherein the logic operable to identify the first talk burst is further operable to identify a start of the first talk burst and to identify an end of the first talk burst.

13. The logic of claim 12 wherein the logic operable to identify the start of the first talk burst is further operable to:
determine if a first flag is obtained;
identify the start of the first talk burst if it is determined that the first flag is obtained;
determine if at least a predetermined number of packets has been obtained within a first predetermined time frame if it is determined that the first flag is not obtained; and
identify the start of the first talk burst if it is determined that the at least predetermined number of packets has been obtained within the first predetermined time frame.

14. The logic of claim 12 wherein the logic operable to identify the end of the first talk burst is further operable to:
determine if a second flag is obtained;
identify the end of the first talk burst if it is determined that the second flag is obtained;
determine if valid audio has not been obtained within a second predetermined time frame if it is determined that the second flag is not obtained; and
identify the end of the first talk burst if it is determined that the valid audio has not been obtained within the second predetermined time frame.

15. An apparatus comprising:
a processor;
a communications interface, the communications interface configured to obtain a plurality of talk bursts including at least a first talk burst and a second talk burst, the first talk burst being associated with a first source included in a push-to-talk (PTT) system, the second talk burst being associated with a second source included in the PTT system, wherein the plurality of talk bursts are obtained at approximately a first time; and
logic configured to be executed by the processor, the logic including a talk burst identification module, the talk burst identification module being arranged recognize the first source and the second source, to identify the first source as a source of interest, to determine an identity of the first source if the first source is identified as the source of interest, and to process the first talk burst as having a priority over the second talk burst.

16. The apparatus of claim 15 wherein the apparatus is a client included in the PTT system.

17. The apparatus of claim 15 further including:
a data storage arrangement, wherein the logic further includes a mapping table module, the mapping table module being arranged to create a record including at least the first talk burst, to store the record in the data storage arrangement, and to add an entry arranged to identify the first source and the record to a mapping table, the mapping table being stored in the data storage arrangement.

18. The apparatus of claim 15 wherein the talk burst identification module is further arranged to identify the first talk burst by identifying a start of the first talk burst and an end of the first talk burst.

19. The apparatus of claim 18 wherein the talk burst identification module is arranged to identify the start of the first talk burst by determining if a first flag is obtained, identifying the start of the first talk burst if it is determined that the first flag is obtained, determining if at least a predetermined number of packets has been obtained within a first predetermined time frame if it is determined that the first flag is not obtained, and identifying the start of the first talk burst if it is determined that the at least predetermined number of packets has been obtained within the first predetermined time frame.

20. The apparatus of claim 18 wherein the talk burst identification module is arranged to identify the end of the first talk burst by determining if a second flag is obtained, identifying the end of the first talk burst if it is determined that the second flag is obtained, determining if valid audio has not been obtained within a second predetermined time frame if it is determined that the second flag is not obtained, and identifying the end of the first talk burst if it is determined that the valid audio has not been obtained within the second predetermined time frame.

* * * * *